United States Patent [19]

Webster

[11] 4,449,082

[45] May 15, 1984

[54] MOTOR SPEED CONTROL SYSTEM

[76] Inventor: Douglas G. Webster, 14450 Blackwalnut Ct., Saratoga, Calif. 95070

[21] Appl. No.: 331,873

[22] Filed: Dec. 17, 1981

[51] Int. Cl.³ .............................................. G05B 5/00
[52] U.S. Cl. .................................. 318/326; 318/327; 318/329; 318/618
[58] Field of Search ............... 318/396, 397, 398, 326, 318/327, 329, 618, 651, 393

[56] References Cited

U.S. PATENT DOCUMENTS

| | | | |
|---|---|---|---|
| 1,880,367 | 10/1932 | Stansbury et al. | 318/396 |
| 3,309,597 | 3/1967 | Gabor et al. | 318/396 X |
| 3,518,516 | 6/1970 | Pawletko | 318/396 X |
| 3,536,975 | 10/1970 | Hough | 318/396 |
| 3,543,115 | 11/1970 | Grygera | 318/327 X |
| 3,843,914 | 10/1974 | Carlson et al. | 318/327 |
| 3,917,989 | 11/1974 | Bereisa, Jr. | 318/398 X |
| 4,160,197 | 7/1979 | Rothman et al. | 318/396 |
| 4,211,967 | 7/1980 | Akiyama et al. | 318/490 |
| 4,232,257 | 11/1980 | Harshberger | 318/314 |
| 4,249,119 | 2/1981 | Robbi | 318/341 |
| 4,259,698 | 3/1981 | Takada | 360/70 |

Primary Examiner—Ulysses Weldon

Attorney, Agent, or Firm—Morgan, Finnegan, Pine, Foley & Lee

[57] ABSTRACT

In a system for controlling within a very tight tolerance the speed of a DC motor, a first servo loop servos the motor to a speed which is close to ideal but not perfect. A second servo loop, operating in concert with the first servo loop, acts as a vernier or fine tuning adjustment to add any necessary correction needed to bring the motor into substantially perfect positional alignment.

The first servo loop utilizes ramp and velocity feedback techniques to achieve constant acceleration by tracking or following a speed command signal profiled to have a linear velocity ramp portion and a final constant velocity portion where acceleration terminates and speed remains constant. Once the motor has accelerated up to the desired speed the second servo loop begins to function in concert with the first servo loop.

The second servo loop utilizes "phase-lock" techniques wherein a phase error signal is derived by comparing the phase of a reference signal generated from a crystal oscillator with the phase of a digital tachometer signal obtained from the motor. This causes the tachometer to phase-lock to the reference oscillator, thereby allowing the long term speed variation of the motor to be controlled with an accuracy approaching that of the crystal utilized to derive the reference signal.

4 Claims, 13 Drawing Figures

| | ENCODER PULSES | OSCILLATOR FREQ. | "S" FREQ. | "O" FREQ. | TWICE FREQ. | SPEED SIGNAL CONVENTION | JUMPER J1 |
|---|---|---|---|---|---|---|---|
| a) | 60 | 100 HZ | 12.5 HZ | 12.5 HZ | 25 HZ | EXCESS 10 HEXADECIMAL | NO |
| b) | 72 | 120 HZ | 15 HZ | 15 HZ | 30 HZ | EXCESS 10 HEXADECIMAL | NO |
| c) | 72 | 120 HZ | 15 HZ | 15 HZ | 30 HZ | NORMAL HEXADECIMAL | YES |

FIG. 2

| | | Y-20 | Y-10 | Y | Y+10 | Y+20 | Y+30 | Y+40 |
|---|---|---|---|---|---|---|---|---|
| T Y P E | 1 | 0 | +1 | +2 | +1 | 0 | -1 | 0 |
| | 2 | +2 | +1 | 0 | -1 | 0 | +1 | 0 |
| | 3 | 0 | -1 | -2 | -1 | 0 | -1 | 0 |
| | 4 | -2 | -1 | 0 | -1 | 0 | +1 | 0 |

FIG. 9

TEST POINTS

1. SPEED VALUE (POSITIVE)
2. SPEED VALUE (NEGATIVE)
3. RAMP VALUE (POSITIVE)
4. RAMP GENERATOR OUTPUT (NEGATIVE)
5. TACHOMETER OUTPUT – ANALOG (POSITIVE)
6. SAW-TOOTH, TRIANGLE WAVE (500 HZ.)
7. FLIP-FLOP (500 HZ)
8. PULSE WIDTH MODULATOR OUTPUT (PWM)
9. BRAKE/$\overline{RUN}$ SIGNAL
10. DIGITAL TACHOMETER (50/50 DUTY CYCLE)
11. DIGITAL TACHOMETER (TWICE FREQUENCY, POSITIVE PULSES)
12. UP-TO-SPEED SIGNAL
13. LOAD PULSE (NEGATIVE) TO PRESET DOWN COUNTER
14. 100/120/120 HZ. OSCILLATOR
15. X = 50/60/60 HZ. OSCILLATOR
16. "O" = B = 12.5/15/15 HZ. OSCILLATOR
17. $\overline{UP-TO-SPEED}$ SIGNAL = ÷ COUNTER RESET
18. INTERLOCK (INTL) FLIP-FLOP
19. Y FLIP-FLOP
20. D FLIP-FLOP = 12.5/15/15 HZ. DIGITAL TACHOMETER
21. ANALOG PHASE ERROR SIGNAL
22. VELOCITY ERROR SIGNAL
23. DIGITAL PHASE ERROR SIGNAL = "O" $\oplus$ "S"
24. $\overline{DEFEAT\ PHASE\ LOCK}$ SIGNAL

FIG. 4

| P2 CONNECTOR | | | |
|---|---|---|---|
| PIN NO. | BIT | | |
| 1 | $A_0$ | | |
| 2 | $A_1$ | | |
| 3 | $A_2$ | | |
| 4 | $A_3$ | PORT 20 | RAMP SIGNAL |
| 5 | $A_4$ | | |
| 6 | $A_5$ | | |
| 7 | $A_6$ | | |
| 8 | $A_7$ | | |
| 11 | $B_0$ | | |
| 12 | $B_1$ | | |
| 13 | $B_2$ | | |
| 14 | $B_3$ | PORT 21 | SPEED SIGNAL |
| 15 | $B_4$ | | |
| 16 | $B_5$ | | |
| 17 | $B_6$ | | |
| 18 | $B_7$ | | |
| 9 | $B_7$ | PORT 09 | UP-TO-SPEED SIGNAL |
| 20 | (TO CPU) | | TACHOMETER SIGNAL |
| 10 | GND | | |
| 19 | GND | | |

FIG. 5

| MAIN P3 | P1 PIGGY BACK | DESCRIPTION |
|---|---|---|
| 1 | 26 | +12 VOLTS |
| 2 | 25 | +5 VOLTS |
| 3 | 24 | $S_7$ (MSB) ⎫ |
| 4 | 23 | $S_0$ (LSB) ⎬ SPEED SIGNAL FROM ADDER |
| 5 | 22 | $S_6$ ⎪ |
| 6 | 21 | $S_1$ ⎪ |
| 7 | 20 | $S_5$ ⎭ |
| 8 | 19 | EXCLUSIVE OR DIGITAL PHASE ERROR SIGNAL |
| 9 | 18 | $S_4$ ⎫ SPEED SIGNAL FROM ADDER |
| 10 | 17 | $S_2$ ⎭ |
| 11 | 16 | BRAKE/$\overline{RUN}$ SIGNAL |
| 12 | 15 | $S_3$ ⎬ SPEED SIGNAL FROM ADDER |
| 13 | 14 | DOWN CLOCK |
| 14 | 13 | ANALOG SWITCH DISABLE SIGNAL |
| 15 | 12 | UP-TO-SPEED SIGNAL |
| 16 | 11 | NON(ZERO + 10) SIGNAL |
| 17 | 10 | $B_6$ ⎫ |
| 18 | 9 | $B_1$ ⎪ |
| 19 | 8 | $B_4$ ⎪ |
| 20 | 7 | $B_3$ ⎬ SPEED SIGNAL INTO ADDER |
| 21 | 6 | $B_2$ ⎪ |
| 22 | 5 | $B_5$ ⎪ |
| 23 | 4 | $B_0$ (LSB) ⎪ |
| 24 | 3 | $B_7$ (MSB) ⎭ |
| 25 | 2 | GND |
| 26 | 1 | GND |

FIG. 6

MOTOR SPEED CONTROL SYSTEM

BACKGROUND OF THE INVENTION

This invention relates to the field of industrial process control, and, more particularly to a system for controlling the speed of a DC motor utilized as part of an industrial process control system.

In many industrial applications utilizing DC motors, it is extremely important that the speed of the motor by accurately controlled in order that the output of the industrial process not change over a period of time. For example, the in-line semiconductor wafer processing system marketed by the assignee of the present invention utilizes one or more motor driven direct-drive wafer spin stations which are equipped with a vacuum chuck for the purpose of holding and spinning a wafer at speeds up to approximately 8000 rpm, during which time various chemicals are applied and dispersed as required by the particular process step being performed. It is clear that the speed of the drive motor must be accurately controlled in order for the output of the industrial process to be repeatable and reproducible from run to run.

Systems for controlling the speed of DC motors are not new. In particular, "velocity feedback" techniques are known and utilized for such purposes by those skilled in the art.

One of the drawbacks and limitations inherent in the known techniques for controlling motor speed is that over the life of the control system one or more of the characteristics or parameters of the system may change. For example, changes in friction, temperature, amplifier gain, etc., all of which affect the speed of the motor, can manifest as speed error in excess of 50 to 100 rpm. Since the speed, in the above example, is the speed of a silicon wafer on which various chemicals are being applied and dispersed "on the fly", these speed changes represent an unwanted factor in the chemical "process" being performed. Moreover, they are an annoyance to the user and are a possible caused of "yield" problems. Accordingly, it is clear that such speed changes are highly undesirable.

An optimal speed control system for DC motors typically utilized in the field of industrial process control would possess certain important attributes. In particular, it should be capable of controlling the speed of the motor to a tolerance on the order of ±2 rpm. Moreover, it should be relatively inexpensive to implement and should be versatile, i.e., capable of being used with various types of DC motors. And finally, it should be reliable, simple and readily adaptable to the motor.

Prior to the present invention it is believed that the above needs have gone unfulfilled.

It is accordingly a general object of the present invention to overcome the aforementioned limitations associated with existing speed control techniques and to fulfill the needs mentioned by providing a speed control system for a DC motor having characteristics more nearly approaching the optimal attributes noted above.

It is a specific object of the present invention to provide a relatively inexpensive system for controlling and maintaining the speed of a DC motor to an accuracy of about ±2 rpm or better.

Other objects will be apparent in the following detailed description and the practice of the invention.

SUMMARY OF THE INVENTION

The foregoing and other objects and advantages which will be apparent in the following detailed description of the preferred embodiment, or in the practice of the invention, are achieved by the invention disclosed herein, which generally may be characterized as a system for controlling the speed of a motor comprising: a first servo loop operatively connected to said motor, said first servo loop employing velocity feedback techniques to servo the motor to a speed substantially close to a desired speed; and a second servo loop operatively connected to and adapted to operate in concert with said first servo loop, said second servo loop employing phase-lock feedback techniques to bring the motor into substantially perfect positional alignment.

BRIEF DESCRIPTION OF THE DRAWINGS

Serving to illustrate an exemplary embodiment of the invention are the drawings of which:

FIG. 2 illustrates the characteristics of the three embodiments of the present invention;

FIG. 4 is a listing of the test points illustrated in FIGS. 3A, 3B, 3C, 3D, 3E;

FIG. 5 is a listing of connector pins on the main board which connect to the controlling CPU;

FIG. 6 is a listing of signal names which interconnect between the main board and the piggyback board;

FIG. 9 illustrates the differences between the four event sequences depicted in FIG. 8.

DESCRIPTION OF THE PREFERRED EMBODIMENT

In accordance with applicant's invention, three exemplary embodiments will be described. The basic difference between the various embodiments relates to the convention utilized to characterize the input digital speed signal and the number of sensing marks employed on the speed sensing encoder.

Figure 1:
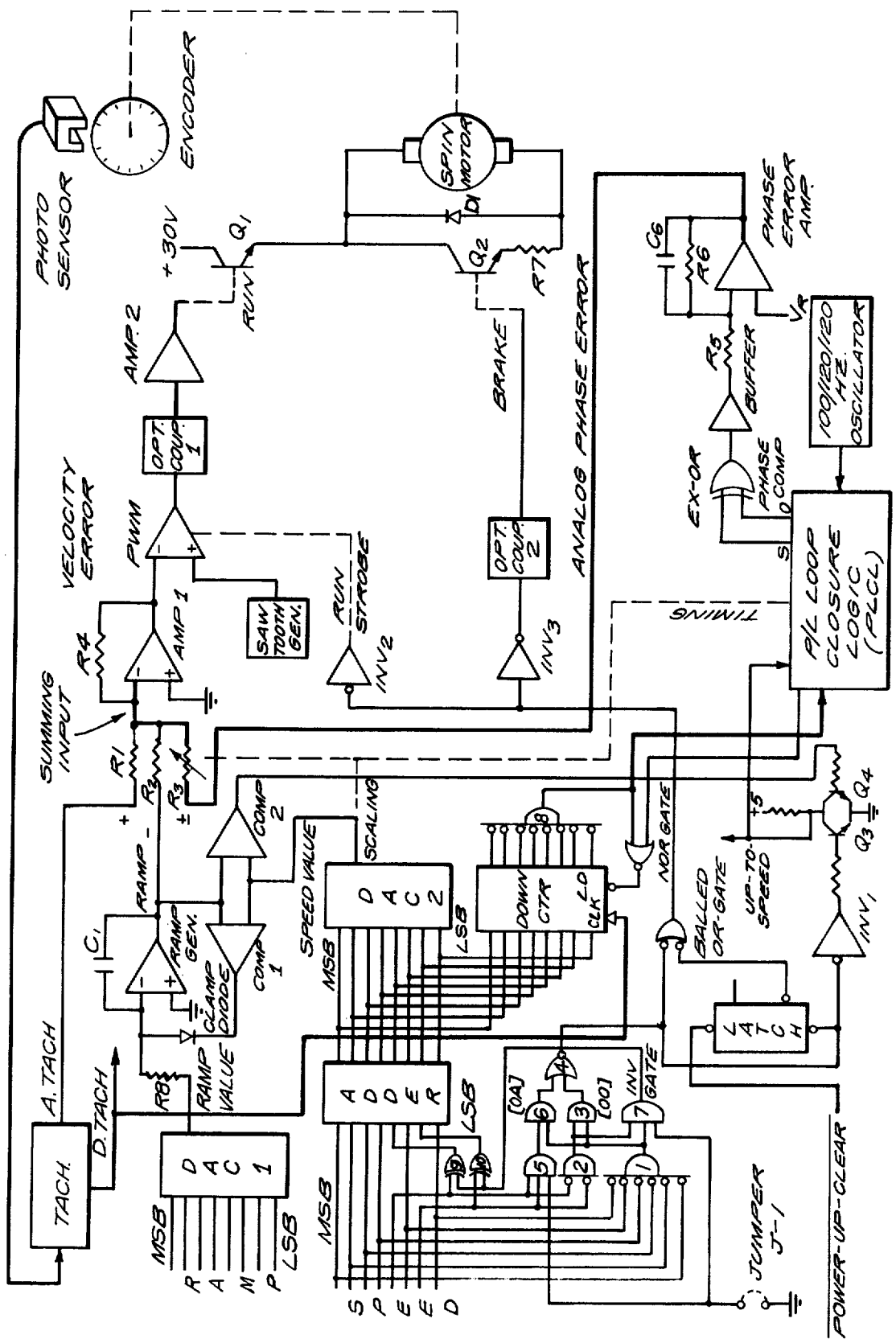
FIG. 1 is a block diagram of the motor speed control system, in accordance with the present invention.
Figure 3A:
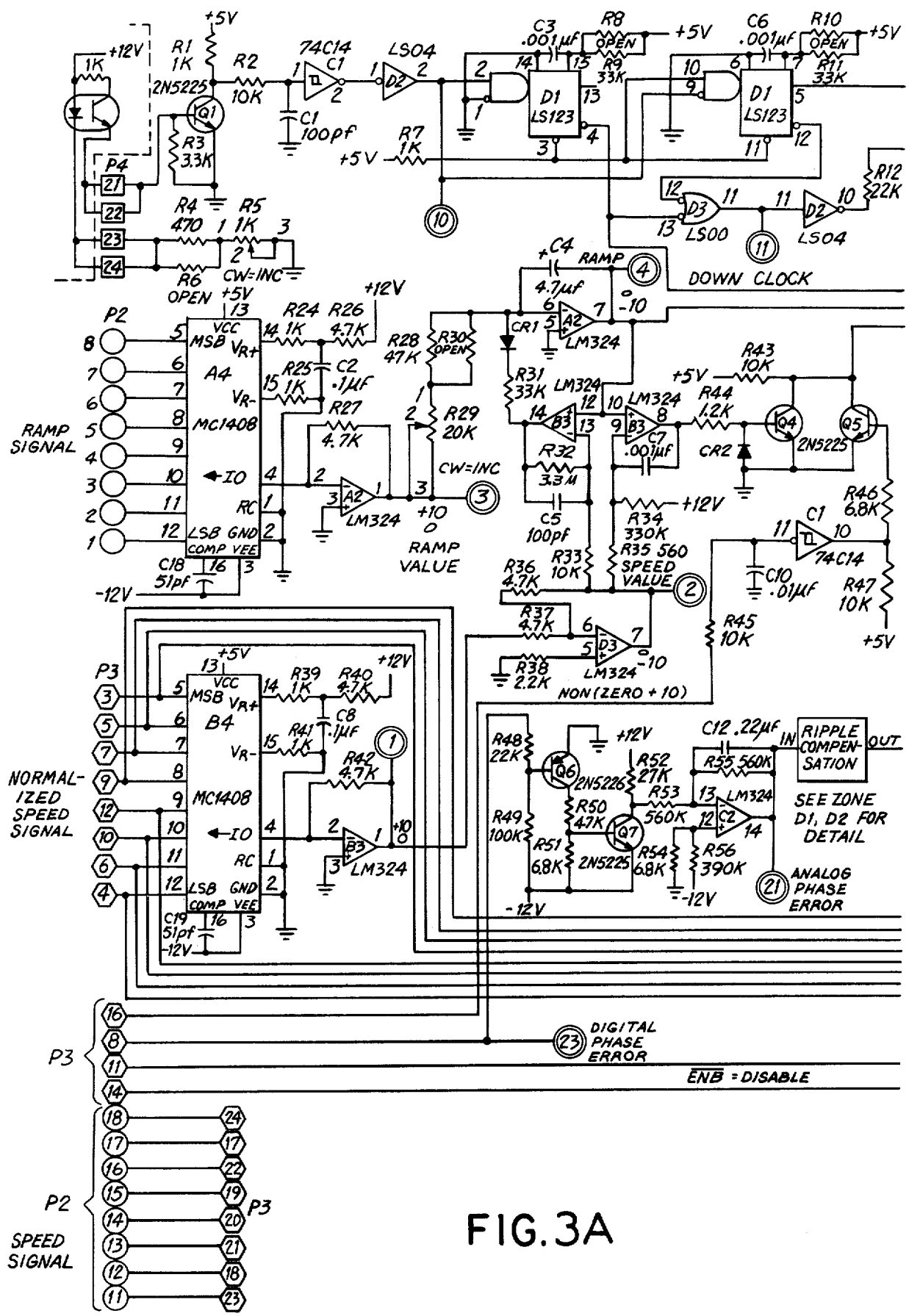
FIGS. 3A, 3B, 3C, 3D, 3E show a detailed schematic diagram of the motor speed control system of the present invention.
Figure 3B:
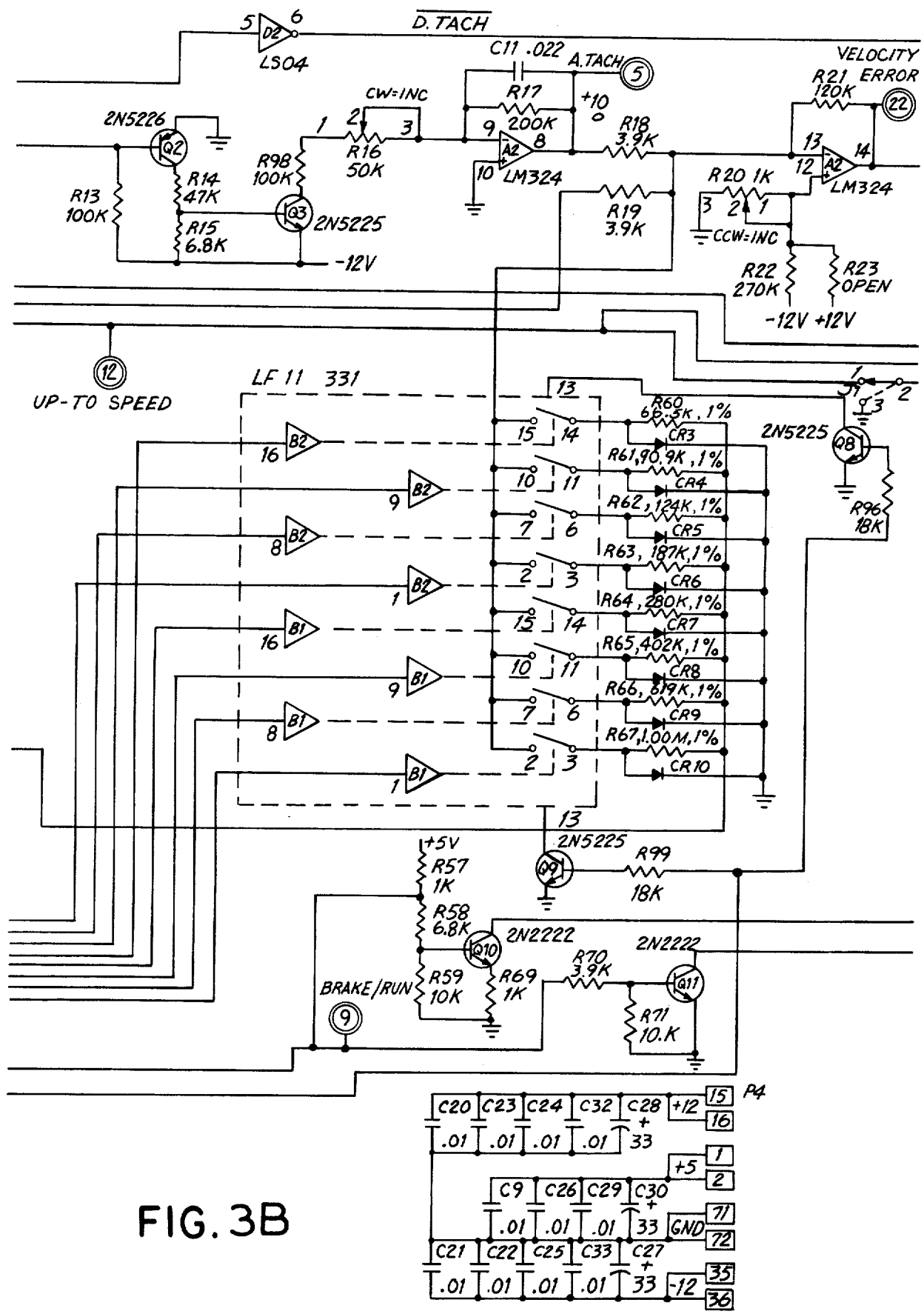
Figure 3C:
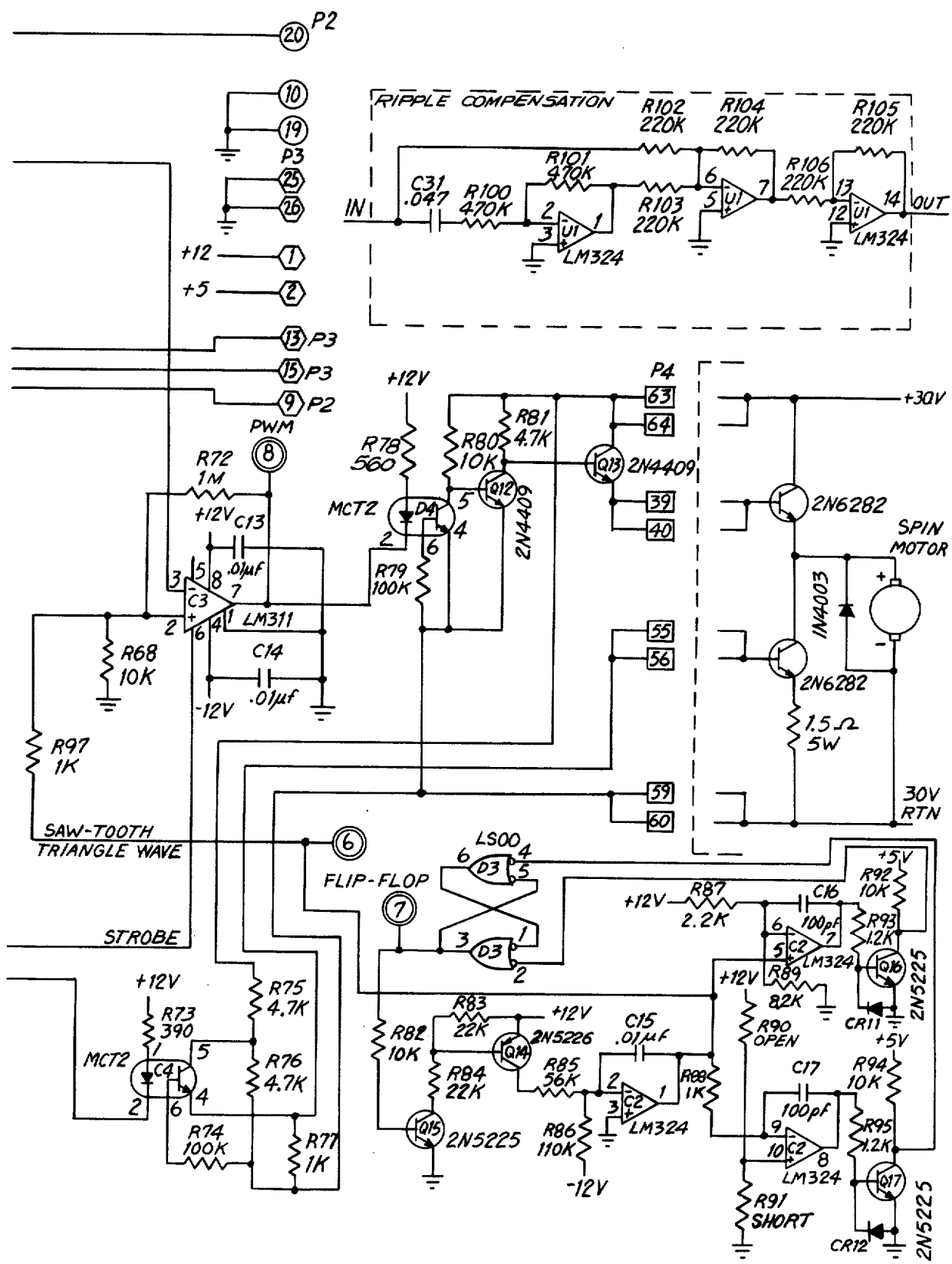
Figure 3D:
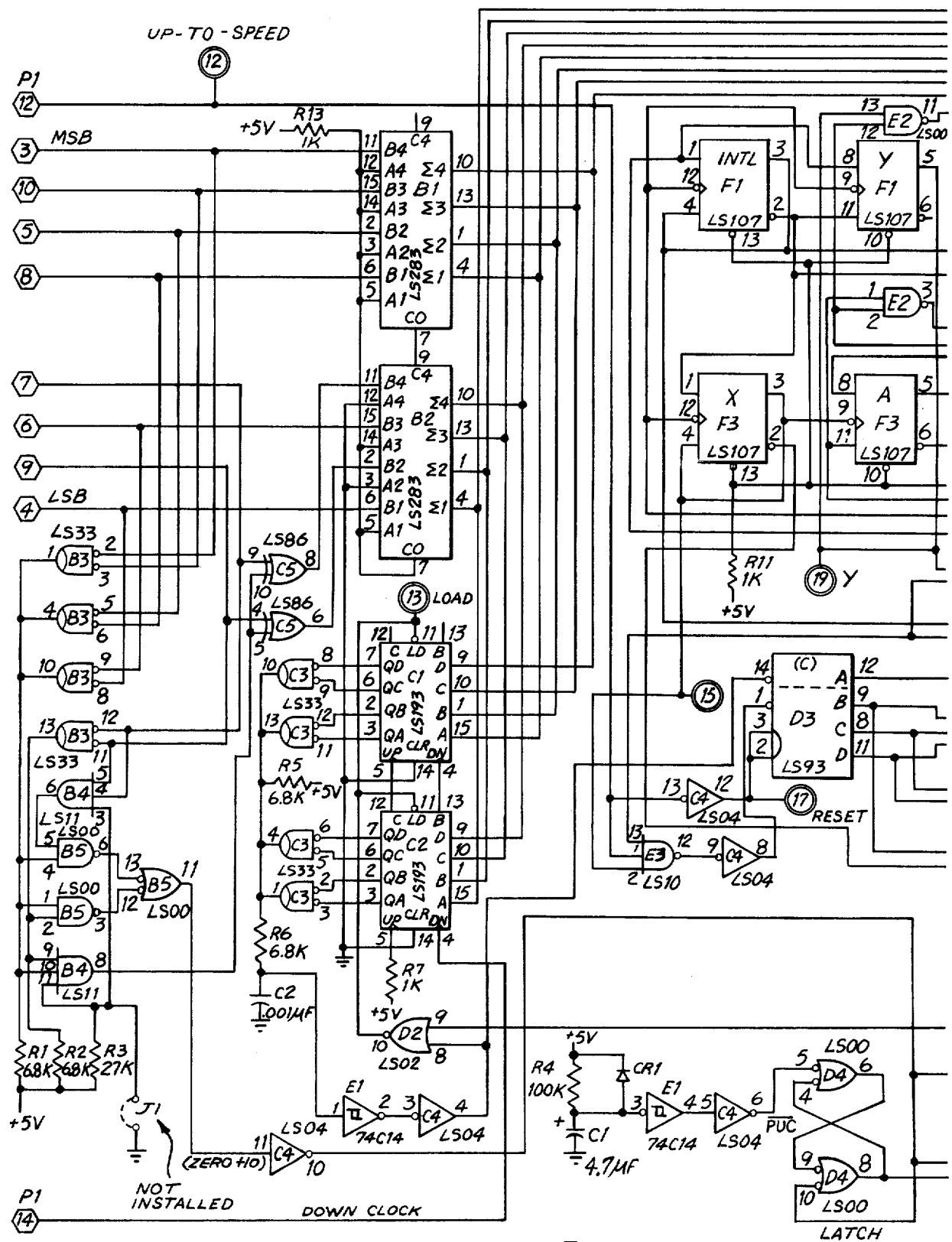
Figure 3E:
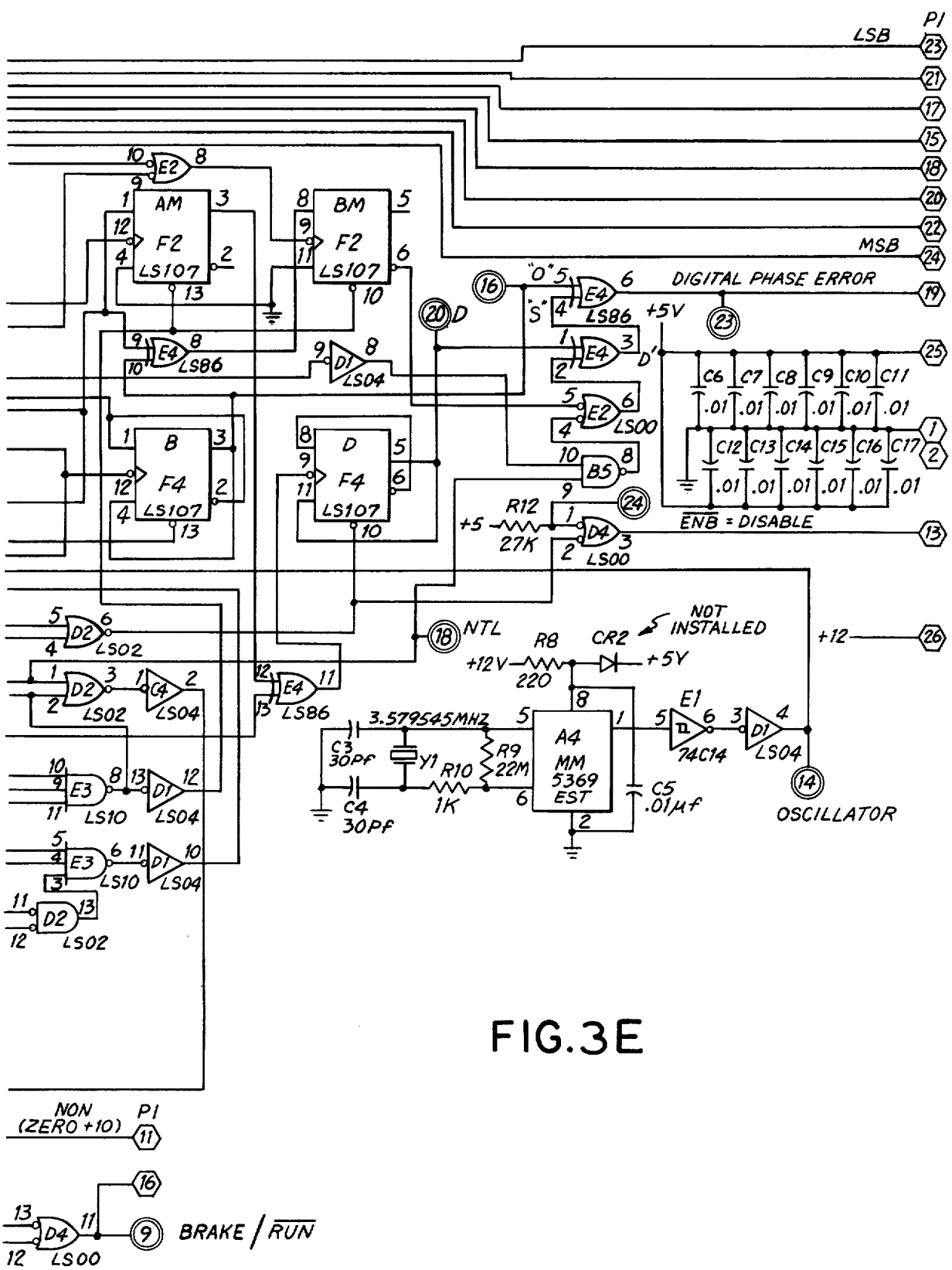

Referring to FIG. 1, a block diagram of the motor speed control system of the present invention is illustrated. As shown therein, an 8-bit binary signal representing the desired acceleration or "ramp" is applied to digital-to-analog converter (DAC) 1 which converts this 8-bit signal to a voltage level labeled "ramp value." Similarly, an 8-bit binary signal representing the desired speed of the motor is applied to DAC 2 (through an 8-bit adder to be explained below) which converts this 8-bit signal to a voltage level labeled "speed value." Both the ramp and speed signals are outputted from a CPU (not shown) associated with an industrial process which utilizes a DC motor.

Initially the ramp and speed signals are set to zero. The 8-bit ramp signal is applied first and the ramp generator attempts to generate a voltage ramp whose slope is proportional to the 8-bit signal. But since the speed value is set to zero, comparator 1 and the clamp diode cause the ramp generator to "servo" to a zero output level. When a non-zero 8-bit speed signal is applied, the speed value immediately shifts to a level proportional to the desired speed of the motor. Comparator 1 will miscompare and the clamp diode will back bias, allowing the ramp generator to generate a voltage ramp. When the ramp generator output reaches a level equal to the speed value, comparator 1 again compares and the clamp diode forward-biases, causing the ramp generator to clamp and maintain at the desired level which is equal to the speed value.

In this manner, the ramp generator generates a "speed profile" consisting of an initial ramp (which controls the acceleration of the motor) which then levels off (maintains a constant level) and controls the final speed of the spin motor. When the 8-bit speed signal is returned to zero, the speed value goes to zero and the servo action of comparator 1 and the clamp diode quickly servos the ramp generator output to zero.

Attached to the spin motor shaft is a photo-electric encoder disk with 60/72/72 marks per revolution. As the motor turns, a photo-electric interrupter detects the marks and generates 60/72/72 pulses per revolution. The tachometer converts these pulses to an analog voltage which is proportional to speed and is labeled "A. Tach." Amplifier 1 is connected to a resistor summing network consisting of R1 and R2 (R3 to be explained below) which connect to the A. Tach. output of the tachometer and the ramp generator output, respectively. However, since the polarity of the A. Tach. signal is positive and the polarity of the ramp is negative, the summing network acts as a difference network.

Amplifier 1 (with the aid of feed-back resistor, R4) produces a "velocity error" signal which is proportional to the difference between the commanded speed (ramp) and the actual speed (A. Tach.). This error signal is connected to the inverting input of a pulse-width-modulator (PWM). The PWM is a comparator whose non-inverting input is connected to a saw-tooth generator. When the error signal is zero, the error signal equals the lowest portion of the saw-tooth and no pulse is generated. As the error signal increases, it intersects with a higher portion of the saw-tooth, causing a pulse train to be generated. The greater the error signal, the greater is the width of the pulse. Thus, the PWM modulates the width of the pulse train between zero and 100 percent duty cycle, based on the level of the error signal.

When the ramp generator first starts to generate a ramp, the ramp exceeds the A. Tach. signal and a positive error signal occurs and a pulse train is generated. This pulse train is applied to optical coupler 1 and amplifier 2 which drives an emitter-follower transistor, Q1, causing the spin-motor to turn. (The motor torque is proportional to the pulse width). As the motor turns, the tachometer output (A. Tach.) increases and the error signal decreases, thus causing the motor to "servo" or follow the speed "command" from the ramp generator. The result is an initial ramp wherein the motor accelerates at a rate proportional to the 8-bit ramp signal until it reaches the desired speed which is proportional to the 8bit speed signal. At this point the motor ceases to accelerate and maintains constant speed until a new speed signal is applied. The new speed signal can be larger, in which case the motor speed will again ramp upward until the correct speed is reached; or the speed signal can be reduced to zero, in which case the motor quickly stops.

The 8-bit speed signal also drives a zero-detect circuit consisting of gates 1, 2, 3, and 4, which activates whenever the speed signal is zero. Upon application of power, the latch is initially set by a power-up-clear signal which activates the balled-or-gate, causing inverter 3 output to go low, activate optical coupler 2 and turn on transistor Q2 which acts as a dynamic brake and keeps the motor from turning. Inverter 2 output also goes low causing the run-strobe signal to the PWM to deactivate to ensure no signal is applied to the motor through transistor Q1. The above action ensures that upon application of power, the motor will not turn, regardless of the speed signal, because of the action of the latch.

The first zero speed signal activates the zero-detect circuit mentioned above, resets the latch, but continues to activate the balled-or-gate and maintains the above condition so that the motor still does not turn.

It is not until the following non-zero speed signal that the balled-or-gate deactivates, at which point the brake signal deactivates, the run-strobe activates, and the motor beings to turn. When the speed signal is returned to zero, the run-strobe is deactivated and the brake is applied. The spinning motor upon removal of the drive voltage from transistor Q1 becomes a generator. As transistor Q2 turns on, however, the generated voltage causes a current to flow through Q2, limited by resistor R7, causing the motor to dynamically brake.

During normal pulse driven operation of the motor through transistor Q1, the motor voltage is constantly turned on and off at the pulse rate of the PWM. Since the motor is inductive, the stored energy tends to destroy transistor Q1 everytime Q1 turns off. The free-wheeling diode, D1, protects transistor Q1 by shunting or clamping the resulting negative voltage spikes from the motor.

The tachometer also has a digital or pulse output labeled "D. Tach.". This signal is returned to the CPU to permit monitoring of the motor speed by the CPU.

A second comparator is provided such that when the ramp generator reaches the speed value, comparator 2 output goes low and transistor Q4 turns off to produce an active high up-to-speed signal. The output of the zero detect circuit, gate 4, is inverted by inverter 1, which drives transistor Q3. When the speed signal is non-zero, gate 4 is high, inverter 1 goes low to turn Q3 off. The collectors of transistors Q3 and Q4 are connected to form a "wired-and" connection. Thus, the up-to-speed signal can activate only when the ramp has completed (comparator 2 compares) "and" the speed signal is non-zero. The "and" function is required to distinguish a legitmate up-to-speed condition as just described from an apparent (but false) up-to-speed condition as follows. When the speed signal is zero, the servo action of comparator 1 and the clamp diode cause the ramp and speed values to be equal, and comparator 2 compares to indicate an apparent up-to-speed condition. However, transistor Q3 turns on and inhibits the up-to-speed signal as required for proper operation of the phase-lock loop closure logic (PLCL). The up-to-speed signal is also returned to the CPU to permit the CPU to know when the motor is up-to-speed; and at that time, speed can be computed as mentioned earlier.

The above described servo achieves constant acceleration by tracking or following a speed command signal profiled to have a linear velocity ramp which is equivalent to constant acceleration. It is commonly called a closed loop velocity servo. Once the ramp completes ramping and becomes clamped, the speed command signal (or ramp) is compared with the actual speed signal. Any difference between these two signals is manifest at the output of the summing network, and is utilized to control the motor speed to reduce the difference or error signal to zero. In practice, however, no tachometer is perfect, and for other reasons the speed measured at the motor is not identical to the commanded speed value derived from the 8-bit speed input signal. For example, possible error sources include the digital-to-analog converters, amplifiers, comparators, summing network, pulse-width-modulator, and friction.

In accordance with the present invention, a second servo loop is added to achieve very precise speed control as follows. The output of a 100/120/120 Hz oscillator, the frequency of which is controlled by a crystal, is fed to the PLCL. Internal to the PLCL, this signal is counted down (by eight) to 12.5/15/15 Hz and becomes the "O" (oscillator or reference) input to an exclusive-or (ex-or) phase comparator. It is noted that the D. Tach. output from the tachometer is connected to the clock input of the down counter. Each time the down counter reaches zero, the zero output is decoded by gate 8 and is used to load the counter with the 8-bit speed signal. With the down counter connected in this manner, the counter acts as a "variable-modulo" preset counter (or a programmable divider stage), where the modulo (or programmable divisor) equals the speed signal.

It is noted that for large values of speed the frequency of the D. Tach. signal is large and so is the divisor. Similarly, for small values of speed, the frequency of the D. Tach. signal is small and so is the divisor. Accordingly, the frequency at gate 8 output is given by F/N where F is the frequency from the encoder and N is the programmable divisor (equal to the speed input signal). It is noted further that if the motor speed is perfect, F/N is a constant. If the motor speed is slightly high, so will be the value of F/N. Thus, by comparing the actual F/N with a precision reference frequency, the actual frequency deviation can be determined.

For example, with a 60 pulse encoder disk, at 5000 rpm the pulse rate from the D. Tach. output will be 5000 Hz. With a scale factor of 50 rpm/bit, the speed signal will be 100. Thus, with a modulo of 100, the counter presets at 1/100 of the tachometer pulse rate, or 50 Hz. This 50 Hz signal from the zero decode, gate 8, connects to the PLCL where it is counted down (by four) to 12.5 Hz and becomes the "S" (speed) input to the phase comparator. As indicated above, the "O" input to the phase comparator for the first embodiment is also 12.5 Hz. Thus, when the speed is exactly 5000 rpm, the "O" and "S" inputs both have the same frequency, i.e., 12.5 Hz.

An analysis of the phase comparator will show that when the "O" and "S" inputs are 90 degrees phase shifted (both are square waves), a twice frequency square wave occurs whose average value is fifty percent (50%) (of maximum). As the phase shifts from the normal 90 degrees, the twice frequency square wave duty cycle is altered such that the average value approaches 0% or 100%, depending on the direction of the phase shift. As the phase shift is varied though a full 360 degrees from the normal 90 degrees, the average value will go from 50% to 100%, 50%, 0%, and back to 50% (or vise versa, based on direction of shift). The 90 degree point (50% average value) is the "stable" operating point and the 270 degree point (50% average value) is an "unstable" operating point.

The output of the phase comparator is buffered and then applied through resistor R5 to phase error amplifier, which, with the feed-back network, resistor R6 and capacitor C6, operates as an active low-pass filter which averages and smoothes the phase comparator output. By connecting one of its inputs to a reference voltage, $V_r$, the stable 50% average value point can be shifted to give a zero volt "phase error" output, which then connects through resistor R3 to the summing input of error amplifier 1.

Thus, when the "O" and "S" inputs are exactly 90 degrees phase shifted, a zero volt correction is "added" through resistor R3, and no change in amplifier 1 output occurs. However, as the motor speed slows down the phase angle will change to cause a negative phase error, causing the velocity error level from amplifier 1 to increase causing the motor to speed up and correct the phase discrepancy. Likewise, should the motor speed up, a positive phase error occurs, causing the velocity error level from amplifier 1 to decrease, causing the motor to slow down and correct the phase discrepancy.

The phase error signal applied through resistor R3 acts as a "vernier correction" or "fine-tuning" signal to correct the speed so as to maintain the phase-lock condition and thus control the speed to a high degree of accuracy. It is noted that the speed accuracy can be as accurate as the crystal, which is typically ±0.001 percent. In fact the long-term accuracy (measured over a 10 second interval) is typically that good, but due to "wow" and "flutter" (speed changes) caused by servo stability and phase error ripple, the short term (instanteous) accuracy is slightly worse. If desired, a ripple compensation network may be utilized to reduce the ripple.

In the previous example, the speed of 5000 rpm was used. It will be noted that at 1000 rpm, with a 60 pulse encoder, the pulse rate from the D. Tach. output is 1000 Hz. But with the scale factor of 50 rpm/bit the speed signal will be 20, and with a modulo of 20 the counter presets at 1/20 of the tachometer pulse rate, or 50 Hz. Thus, it can be seen, that because of the variable-modulo feature, the counter always presets at the 50 Hz rate, providing the motor is turning at exactly the prescribed speed. For this reason, phase-lock can be achieved at virtually any speed within the design range of the motor and motor speed control system.

As indicated earlier, the second and third embodiments of the motor speed control system of the present invention employ a 120 Hz oscillator which is counted down (by eight) to 15 Hz which becomes the "O" input to the phase comparator. For these two embodiments, however, a 72 pulse encoder is used, and at 5000 rpm, the pulse rate from the D. Tach. output will be 6000 Hz. With a scale factor of 50 rpm/bit, the speed signal will still be 100. And with a modulo of 100 the counter presets at 1/100 of the tachometer pulse rate or 60 Hz. The 60 Hz signal from the zero decode, gate 8, connects to the PLCL where it is counted down (by four) to 15 Hz and becomes the "S" input to the comparator. Thus, by increasing the oscillator frequency, and the encoder pulses by a factor of 6/5, the "O" and "S" inputs still have the same frequency, i.e., 15 Hz. In some applications, there may be a design advantage to using the 72 pulse encoder over the 60 pulse encoder. Again because of the variable-modulo feature, as discussed above, phase lock can be achieved at virtually any speed. The twice frequency phase error signal from the phase comparator will be 6/5 higher for the second and third embodiments than for the first embodiment.

It is noted that resistor R3 is shown as a variable resistance and is controlled (dotted lines) by the "Scaling" signal from DAC 2 and by the "timing" signal from the PLCL. For small speed signals, a small (weak) phase correction is needed to maintain servo stability, and resistor R3 is made large. However, for large speed signals, a large (strong) phase correction is needed and resistor R3 is made small to achieve the required correction, consistent with servo stability. The value of the reciprocal of R3 as a function of speed value is non-linear and will be discussed in detail below.

The timing signal from the PLCL to resistor R3 is an on/off type signal and has the effect of closing or opening the connection of R3 to the summing input of amplifier 1. During the time that the motor is ramping up to the desired speed, the phase-lock loop must be defeated by disconnecting resistor R3 (open circuit). When the motor completes the ramp and any velocity over-shoot has settled, then the phase-lock loop is closed (closed circuit) to achieve phase-lock. Note that the up-to-speed signal is fed to the PLCL which computes the required delay, then activates the timing signal to close the loop and achieve phase-lock. During the ramp and settling time the loop is held open by the PLCL which also (via the nor-gate) forces a load signal to the down counter. In this way the PLCL can close the loop and simultaneously remove the load signal, which releases the down counter to start counting from a "known" state.

In this manner the "S" input and the "O" input to the phase comparator are "predictable" and "repeatable" so as to achieve loop closure without introducing a "phase-disruption" as will be explained in detail below. A phase-disruption would cause the motor velocity to meomentarily surge upward or downward based on the direction of the disruption. By carefully controlling the time of loop closure, and the preset (starting) condition of the down counter, its (divide by four) counter which becomes the "S" input and the oscillator (divide by eight) counter which becomes the "O" input to the phase comparator, the loop-closure occurs in such a way as to produce no phase-disruption, and the final steady-state velocity is gently, but quickly, pulled and locked to the crystal oscillator.

The last described loop including (but not limited to) the digital tachometer, down counter, PLCL, phase comparator, phase error amplifier, resistor R3, amplifier 1, pulse-width-modulator, motor, encoder, and photosensor constitute a second servo loop. Since the first servo loop is still operative, the second servo loop works in cooperation with the first loop and in concert they achieve the desired results. More specifically, the first loop, although reasonably accurate by itself, servos the motor to a speed which is close to ideal but not perfect. The second loop acts as a vernier of fine tuning adjustment to add the necessary correction required to bring the motor into perfect positional alignment with a reference frequency. The positional error signal can be slightly off from the ideal zero condition, and as long as this deviation is constant, the total velocity error of the motor is zero. Since velocity is the first derivative of position (with respect to time), no velocity error is manifest as long as the positional error signal is constant.

As indicated above, the 8-bit speed signal is applied to DAC 2 through an 8-bit adder. More specifically, in the first and second embodiments, which are both software compatible with a speed signal represented by the older "excess-10" hexadecimal notation, the 8-bit adder is employed. It is connected as a subtractor, and converts the applied excess-10 signal to a normal hexadecimal signal as required by DAC 2. The subtract by ten function is achieved by adding the two's complement of ten and adding one. This constant which is added to each 8-bit speed signal applied is in the form of a "hard-wired" connection to the adder.

Note that 6 bits of the speed signal are connected directly to the adder. Two bits, however, are routed through the exclusive-or gates, 9 and 10, which normally act as noninverting buffers. Thus a normal subtract by 10 is achieved as explained above. In the excess-10 convention, the values of zero and ten are legitimate speed signals for zero rpm. and each must be recognized and cause the motor to brake. Note that gates 1, 2, and 3 decode the zero or [00]* state and gates 1, 5, and 6 decode the ten or [OA]* state. Gates 3 and 6 are "nored" in gate 4 and control the motor brake and run-strobe signals as discussed previously. If the speed signal is ten, it is converted to zero by the adder and DAC 2 generates a speed value of zero and the ramp generator is properly clamped to zero level, in preparation for the next ramp. If a speed signal of zero is applied to the adder, however, the adder converts this to [F6] which is a large signal nearly equal to the full scale [FF]. This would cause the speed value to approach +10 volts and the ramp generator would not be clamped to zero, as required, prior to each new ramp. For this reason, gate 7 is used to decode the zero speed signal which then goes high and causes the exclusive or gates, 9 and 10, to function as inverters. This causes the zero signal [00] to be converted to ten, [OA], which is reconverted by the adder to zero as required by DAC 2. Note that in the excess 10 convention, zero and ten are properly treated, but nine illegal speed signals, one through nine, are not. Software design must never allow these illegal values to issue.

* indicates hexadecimal notation

In the third embodiment, which is software compatible with a speed signal represented by the normal hexadecimal convention, the 8-bit adder is not used (the eight signal lines are jumpered "through") and DAC 2 receives a normal hexadecimal (8-bit) signal. In summary, there are three embodiments of the motor speed control system as shown in FIG. 2. The first, (a), version is called the 60 pulse encoder, excess-10 version. The second, (b), version is called the 72 pulse encoder, excess-10 version. The third, (c), version is called the 72 pulse encoder, normal version. FIG. 2 summarizes the characteristics described above.

The above description is somewhat simplified and a detailed description of the present invention will follow with the aid of the schematic illustrated in FIG. 3. It is noted that when a particular gate or amplifier is identified in the following description, it will be done by means of its location and output pin.

The motor speed control system assembly consists of two printed circuit boards mounted back to back and separated physically by four spacers and an insulation sheet. The main board contains a 20 pin ribbon conector for connection to an external CPU (not shown). Both boards contain a 26 pin ribbon connector and are interconnected by means of a short 26 conductor ribbon cable assembly.

FIG. 4 is a listing of 24 test points which appear on the schematic of FIG. 3 as double circles. These are the most likely points of interest during test and will be referenced in the following discussion.

FIG. 5 is a listing of the 20 pins of ribbon connector, P2, (which connects the main board to the CPU) and shows the port and bit assignment for the 8-bit speed signal and the 8-bit ramp signal from the CPU to the motor speed control system plus the up-to-speed signal and tachometer signal from the control system to the CPU.

As shown in FIGS. 3A, 3B, 3C, 3D, 3E, the 8-bit speed signal enters the main board on P2 ribbon pins 11 through 18 and then exits to the piggy-back board on P3 ribbon pins 17 through 24. The 26 conductor cable assembly connects P3 to P1. FIG. 6 is a listing of the 26 signal names but because of the back-to-back connection, the pin number sequences for P3 and P1 are reversed as shown. Thus, the 8-bit speed signal enters the piggy-back board on P1 ribbon pins 3 through 10.

As previously indicated, 6 of the signals connect directly to the 8-bit adder, B1 and B2, but the second and fourth significant bits (ribbon pins 9 and 7) are routed through two exclusive-or-gates. It is noted that the carry input, Co, (B2-7) is a hard wired "1" (high) and a hard wired 1111 0101 or [F5]* connection is made to the eight adder inputs. The [F5] is the two's complement of (10)=[0A].
* indicates hexadecimal notation Thus the adder performs the subtract by ten function by adding the two's complement of ten and adding one. The add by one is achieved by forcing the carry input high. In the third embodiment, the adder is jumpered through because no subtraction is needed in the normal hexadecimal convention.

The eight gates shown vertically in a row perform the previously mentioned functions of decoding the zero and ten states. Gates B3 are open-collector nor-gates but are shown as open-collector balled-and-gates. Thus the connection of pins 1, 4, and 10 causes these three gates to function as a 6-input balled-and-gate. It is noted that B5-3 decodes the zero state and B5-6 decodes the ten state if Jumper J1 is omitted. Thus the output at C4-10, P1 ribbon pin 11, is the non (zero+10) signal as shown in FIG. 6, as required for the first and second embodiments. However, for the third embodiment, the Jumper J1 is installed to inhibit the 10 term as mentioned previously.

It is noted also that B4-8 decodes the ten state, if Jumper J1 is omitted and drives the two exclusive-or-gates, C5-8 and C5-6. Normally B4-8 is low and the two exclusive-or-gates act as non-inverting buffers; but when B4-8 goes high, they become inverting buffers and convert the applied (00)=[00] speed signal to (10)**=[0A]* as described above. In the third embodiment, Jumper J1 is installed to inhibit this action as required for the normal hexadecimal convention.
* indicates hexadecimal notation
** indicates decimal notation The 8-bit normalized (converted from excess -10 to normal hexadecimal) speed signal, $S_0$ through $S_7$ (see FIG. 6), is returned from the piggy-back to the main board and connects to the speed DAC, B4, which has a "constant current" output on pin 4. Current flows into pin 4 and is proportional to the 8-bit speed signal applied, and is scaled by resistors R39, R40, and R41 at 2 milli-amp for a [FF] input. Amplifier B3-1 with its feedback resistor R42 serves as a current-to-voltage converter and converts the 2 milli-amp current from the DAC to a +10 volt full-scale output at B3-1, test point 1. Amplifier B3-7 with its input resistor R37 and feedback resistor R36 acts as a voltage inverter with unity gain and produces a -10 volt output at B3-7, test point 2, for a [FF] input to the DAC.

The 8-bit ramp signal (see FIG. 5) from the CPU enters the ramp DAC, A4, directly via P2 ribbon pins 1 through 8. Again the scaling resistors, R24, R25, and R26 set the current into pin 4 of the DAC at 2 milli-amp for a [FF]input. Amplifier A2-1 serves as a current-to-voltage converter and converts the 2 milli-amp current from the DAC to a +10 volt full-scale output at A2-1, test point 3.

Amplifier A2-7 is connected as an integrator with its feedback capacitor, C4, and input resistors, R28, and R29 and acts as the ramp generator. When a ramp signal is applied to the ramp DAC, test point 3 immediately assumes a voltage level (ramp value) proportional to the 8-bit ramp signal. The speed signal is applied later, however, and is intitally set to zero =[00]* and the voltage at test point 2 is zero. Amplifier B3-14 is connected as a comparator and through resistor R31 and diode CR1 acts as a clamp and servos the output of A2-7, test point 4, at zero volts, and no ramp occurs. It is not until a non-zero speed signal is applied that test point 2 goes negative, causing amplifier B3-14 to miscompare and diode CR1 to back bias. This action allows a negative voltage ramp to be generated at test point 4 where the slope is given by:

$$\frac{de}{dt} = \frac{i}{C} = -\frac{Vr}{C(R28 + R29)} \quad (1)$$

where (i) is the applied current generated by the ramp value, Vr, at test point 3, through resistors R28 and R29 and C is the feedback capacitor, C4.
* indicates hexadecimal notation The voltage at test point 4 ramps negative until it equals the voltage at test point 2, which is the speed value. At this point, amplifier B3-14 again compares, diode CR1 forward biases, and test point 4 servos and maintains at a negative voltage equal to the speed value at test point 2. It can be seen from equation 1 that the ramp can be calibrated using resistor R29. The closed loop gain of amplifier B3-14 is controlled by the ratio of R32 to R33 which is very high and thus amplifier B3-14 acts as a comparator. The response time of the comparator is purposely "spoiled" (slowed down) by capacitor C5 to eliminate any tendency to oscillate.

When the speed signal is returned to zero, the speed value at test point 2 immediately returns to zero volts, causing comparator output B3-14 to go full negative, sinking current through resistor R31 and diode CR1 causing the ramp level at test point 4 to quickly rise to zero volts and servo at that level. The rise time of the ramp is limited by resistor R31 and the deceleration rate is approximately equal to the maximum acceleration rate for a [FF]* ramp signal (51,000 rpm/sec).
* indicates hexadecimal notation Referring to the relationship between the decimal, normal hexadecimal, and excess-10 hexadecimal for decimal values from zero to 255, it is noted that the excess-10 is always larger than the normal hexadecimal by ten. It is noted further that when the decimal value reaches 246, the excess-10 value rolls over to zero. Thus in the first and second (excess-10) embodiments with Jumper J1 is removed, both [00] and [0A] are decoded at C2-10 and, as will be seen later, cause the motor brake to operate. It is noted also, that gate B4-8 decodes the [00]

causing the two exclusive-or-gates to properly convert the [00] to [OA]. However, decimal values 247 through 255 are the nine illegal values which result from excess-10 values [01] to [09] and, as stated earlier, must be avoided in software.

The photo-electric interrupter which drives the tachometer is the H13A1. As illustrated in FIGS. 3A, 3B, 3C, 3D, 3E, the photo-transistor collector (in series with a 1K resistor) and the LED anode are connected to +12 volts. Resistors R4 and R5 connect to the LED cathode via P4 pin 23 and 24 and control the current through the LED. The photo-transistor emitter, via P4 pin 21 and 22 connects to the base of transistor Q1. Since the base of Q1 is nearly constant in voltage, the photo-transistor operates in a "current steering" mode (similar to ECL logic) and permits the H13A1 to operate at a much higher pulse rate than if connected in the more conventional "voltage steering" mode. The result is that Q1 turns on and off for each mark on the encoder disk causing a pulse train to generate at inverter output D2-2, test point 10.

The RC low-pass filter network, resistor R2 and capacitor C1, and the hysteresis property of Schmitt inverter C1-2 eliminate any tendency to oscillate or "chatter" on the leading or trailing edges of the pulse train. Inverter output D2-2, test point 10, connects to the non-inverting input of one-shot D1-13 and the inverting input of one-shot D1-5. Thus, the first one-shot triggers on the leading edge of each pulse and the second one-shot triggers on the trailing edge of each pulse. The balled outputs of the two one-shots are combined by balled-or-gate D3-11, test point 11, into a single pulse stream whose pulse rate is double that of the input pulse stream, test point 10.

The positive pulse stream at test point 11 is inverted by inverter D2-10 and then inverted twice again by the two transistor amplifier consisting of Q2, Q3, and the associated resistors. The resulting negative pulse stream at the collector of Q3 is applied to the low-pass active filter consisting of amplifier A2-8, feedback components capacitor C11 and resistor R17 and input resistors R16 and R98, which inverts, smoothes and averages the pulse stream input. The result is a positive voltage output at A2-8, test point 5, which is proportional to the pulse repetition rate, which is proportional to the encoder (motor) speed.

The above described circuits which are driven from the H13A1 photo-interrupter constitute the tachometer section. The digital (D. Tach.) one-shot output, D1-5, is buffered by inverter D2-6 and returned as the tachometer signal on P2 ribbon pin 20 to the CPU. The analog output (A. Tach.) appears at test point 5. Since the gain of the active filter is given by the ratio of R17 to R16+R98, potentiometer R98 controls the gain of the analog tachometer output at test point 5. The exponential time constant for the active filter is given by the product of R17 and C11. There is some ripple at test point 5, but because of the long time constant, is held to approximately 80 milli-volts. The ripple is allowed to reach 80 milli-volts to improve the transient response. Any response delay due to a long time constant in the active filter, causes a delay in the analog tachometer and ultimately results in excessive velocity over-shoot when high acceleration rates are used. By using two one-shots as described above, the pulse rate at test point 11 is twice the encoder pulse rate at test point 10 and the ripple and reaponse parameters discussed above are improved by a factor of two.

With a positive tachometer signal at test point 5 and a negative ramp signal at test point 4, the resistor summing network, R18 and R19, serves as a resistor difference network. Since R18 and R19 are equal in value, the gain of amplifier A2-14 to a tachometer input or ramp input is equal and is given by the ratio of R21 to R18 which equals approximately 31. Therefore, any voltage difference between the ramp and tachometer voltages appears as a voltage, 31 times greater at test point 22, which is the velocity error signal.

This gain of 31 enhances low speed performance as follows. The full scale ramp output at test point 4 is 10 volts, for a [FF]* input to the speed DAC. This is equivalent to 39 milli-volts per step, for each of the 256 possible values. But with a gain of 31, it only takes a speed value of (08) **=[08] to develop 10 volts at test point 22, and achieve full stall torque at the motor, assuming a stalled motor and no tachometer output.

* indicates hexadecimal notation
** indicates decimal notation

The velocity error signal at test point 22 is applied to the inverting input of comparator C3-7 and the sawtooth generator signal at test point 6 is applied to the non-inverting input through resistor R97. The sawtooth is actually a 500 Hz triangle wave which ramps between zero and +10volts. The value of resistor R72 and the combination of resistors R68 and R97 determine the amount of positive feedback and resulting hysteresis. As described above, comparator C3-7 acts as a PWM and modulates the width of the negative pulse from C3-7, test point 8, based on the level of the velocity error signal.

Based on a negative ramp signal and a positive tachometer signal, it can be seen that when the ramp exceeds the tachometer, the error signal at test point 22 will be positive. As the error signal becomes more positive, it intersects with a higher point on the triangle wave and causes a wider negative pulse at C3-7, test point 8. The negative pulse turns on the LED in optical coupler D4, turns on the photo-transistor, turns off Q12, turns on Q13, and via P4 connector pins 39 and 40 applies +30 volts to the motor. Thus the stall torque and resultant free running speed is proportional to the velocity error at test point 22.

The saw-tooth (triangle wave) output at test point 6 is derived from amplifier C2-1 which is connected as an active integrator or ramp generator. Assuming transistor Q14 is off, current is sunk through resistor R86 to −12 volts and amplifier C2-1 ramps upward at a rate controlled by resistor R86 and capacitor C15. Resistors R87 and R89 bias the inverting input of comparator C2-7 at approximately +10 volts. When the triangle wave reaches +10 volts, comparator C2-7 goes positive momentarily, turns on transistor Q16, and toggles the flip-flop, test point 7, made up of gates D3-6 and D3-3, causing transistors Q15 and Q14 to turn on. It is noted that the emitter of transistor Q14 connects to +12 volts and that resistor R85 is one-half the value of resistor R86. Therefore, the inverting input of amplifier C2-1 instead of having current sunk to −12 volts, now has current sourced from +12 volts. Because of the 2:1 ratio of resistors R86 and R85, the magnitude of the current remains constant and only the direction changes. Thus the output voltage ramp at amplifier C2-1 simply changes direction, maintaining a slope of equal magnitude but different in sign, resulting in a triangle wave. Since the non-inverting input of comparator C2-8 is connected to ground, C2-8 will momentarily go positive when the triangle wave reaches zero volts, which turns transistor Q17 on, toggles the flip-flop, turns transistors Q15 and Q14 off, and the triangle wave generation repeats. Capacitors C16 and C17 are included in the feedback paths of the two comparators to spoil the high frequency response.

Everything being perfect, a zero velocity error at test point 22 would be required for a (00) **=[00]* speed signal into the speed DAC. However, several offset errors occur as follows. At zero rpm, a small tachometer offset exists at test point 5. At zero speed signal, a small ramp offset exists at test point 4. Because of comparator delay at C2-8, the triangle wave goes slightly below zero volts. And because of motor and spindle friction, a small velocity error at test point 22 is needed at zero rpm to compensate. Because of the above four offsets, an off-set bias network consisting of resistors R20 and R22 is connected to the non-inverting input of error amplifier A2-14. (Adjustment of potentiometer R20 will be discussed below.)
* indicates hexadecimal notation
** indicates decimal notation The voltage signal observed across the motor terminals is the composite of three components. When the volage pulse is applied to the motor, the voltage will be approximately +27 volts. When the pulse is removed, the stored energy causes a negative pulse to occur which is clamped to −0.7 volts by the free-wheeling diode in parallel with the motor. When the stored energy has dissipated, the motor is free to act as a generator and the voltage will rise and maintain at a level which is proportional to the motor speed. During this portion of the cycle, the commutator ripple can be observed. This level will maintain until the next pulse is applied to the motor.

The latch described above is made up of gates D4-6 and D4-8. Upon application of power, capacitor C1 is discharged and a negative pulse at C4-6 sets the latch and an active low is presented at pin 12 of balled-or-gate D4-11, causing test point 9, the brake/run signal to go high which causes the motor to brake. When the first (zero+10) signal occurs, inverter C4-10 goes low, resets the latch, and presents an active low at pin 13 of balled-or-gate D4-11 to sustain the motor brake condition. When the following non (zero+10) signal occurs, inverter C4-10 goes high, both inputs to the balled-or-gate D4-11 are high, and D4-11 gate output, test point 9, goes low. This brake/run signal enters on P3 ribbon pin 11 and when at a high level, turns on transistor Q11, turns on the LED of optical coupler C4, turns on the photo-transistor, applies a positive voltage to P4 connector pins 55 and 56 to brake the motor through the 1.5 ohm emitter resistor. When test point 9 is high, transistor Q10 is on and inhibits the strobe signal to the PWM, C3-7, and no motor voltage is applied. However, when test point 9 goes low as described above, transistor Q11 turns off to disable the brake and transistor Q10 turns off to activate the strobe to the PWM and the PWM will now issue a negative pulse stream to turn the motor, if a velocity error signal exists at test point 22.

The up-to-speed comparator is amplifier B3-8. It compares the voltages at test points 4 and 2, in a manner similar to that described previously in respect of amplifier B3-14. The major difference is the resistor bias network consisting of resistors R34 and R35. This network provides a ½ bit offset for small speed values and a full one bit offset at higher speeds. Therefore, comparison at B3-8 occurs near the end of each ramp, but between ½ and one bit before the ramp ends, to signal an up-to-speed condition. At this time, comparator B3-8 goes negative, transistor Q4 turns off, and test point 12 goes high and signals an up-to-speed condition to the CPU on P2 ribbon pin 9. Jumper, J1, is provided to allow a ground connection to the CPU, for certain applications. Note that transistor Q5 must be off to permit the up-to-speed signal to activate because of the common-collector "wired-and" connection. Then non (zero+10) signal from the piggy-back board enters the main board on P3 ribbon pin 16, is inverted by Schmitt inverter C1-10 and causes transistor Q5 to turn on for the (zero+10) condition to inhibit the up-to-speed signal for the zero rpm speed signal. The low pass RC filter consisting of resistor R45 and capacitor C10 provides a small delay and thus eliminates any gating noise (slivers) at the commencement of each ramp. The feedback capacitor, C7, on amplifier B3-8 is provided to spoil the high frequency response and eliminate any tendency to oscillate.

As discussed previously, and as shown in FIG. 1, the PLCL (phase-lock loop closure logic) performs several functions essential to implementing the phase-lock feature. These functions and the phase-lock feature are described below. The PLCL consists of eight flip-flops, the 74LS93 counter, and associated gating (not including E4-6).

The oscillator consists of a 3.579545 MHz crystal (for the first embodiment) or a 4.194304 MHz crystal (for the second and third embodiments), with its associated RC network, and counter which divides the crystal frequency down to 100 Hz using the MM5369EST (first embodiment) or to 120 Hz using the MM53107AA (second and third embodiments). The MM5369EST is operated in series with 200 ohms at +12 volts (diode not installed) and the MM53107AA is operated in series with 6.8K ohms and clamped at one diode drop above +5 volts (+5.7 volts). The 100/120/120 Hz signal is twice inverted and can be observed at test point 14. Flip-flops X, A and B are connected as a 3-stage ripple counter and divide the oscillator frequency by a factor of eight to 12.5/15/15 Hz. The B flip-flop output, F4-3, is the "O" (oscillator) input, test point 16, to the exclusive-or phase-comparator E4-6.

The active-low pulsed output from one-shot D1-4 is a digital tachometer signal and enters the piggy-back board on P1 ribbon pin 14 and becomes the down clock to the 8-bit down counter, C1 and C2. The four balled-and-gates connected to the eight output pins act as an 8-input balled-and-gate and decode the zero-state of the down counter. The eight input (parallel load) pins of the down counter are connected to the normalized hexadecimal eight input lines to the speed DAC. The zero-state decode-gate output, C3-1, is filtered through resistor R6 and capacitor C2, twice inverted and then applied as one of the inputs to the nor-gate D2-10 to cause a parallel load, test point 13, of the down counter. With this connection, the down counter becomes a variable-modulo preset counter where the modulo is equal to the normalized hexadecimal speed signal. The filter action of resistor R6 and capacitor C2 and the hysteresis affect of the Schmitt inverter provide pulse stretching and pulse delay to avoid an ambiguous or partial asynchronous load of the down counter. The zero decode signal at inverter output C4-4 is divided by two at flip-flop output D3-12 and through gate E4-11 is again divided by two at flip-flop output F4-5, test point 20, and through gate E4-3 becomes the "S" (speed) input to the exclusive-or phase-comparator, E4-6.

As indicated above, by using a 60/72/72 pulse encoder, when the motor is turning at precisely the correct speed, the "O" and "S" inputs to the phase-comparator will be at the same (12.5/15/15 Hz) frequency, and a digital phase error signal is generated at E4-6, test point 23, which enters the main board on P3 ribbon pin 8 where it is twice inverted through transistors Q6 and Q7 and applied to amplifier C2-14 which is connected as a low-pass active filter. Amplifier C2-14 smoothes and averages the digital error signal. The gain is set at unity by resistors R55 and R53 and the RC time constant is controlled by resistor R55 and capacitor C12. The collector of transistor Q7 switches between +12 volts and −12 volts and with a small offset correction provided by resistors R54 and R56, the analog phase error signal at C2-14, test point 21, operates symmetrically +12 volts about ground depending on the phase shift; but for the stable operating point, ("O" and "S" inputs are 90 degrees phase shifted) the analog error signal will be at zero volts and will go positive or negative depending on the deviation from the ideal 90 degree phase shift.

In FIG. 1, the analog phase error signal was shown connected to the velocity error amplifier summing point through a variable resistor which is scaled by the speed value. This was a simplified explanation of what actually occurs. As indicated in FIGS. 3A, 3B, 3C, 3D, 3E the variable resistance connection takes the form of eight precision resistors, R60 through R67, and scaling is achieved by means of eight analog switches, each of which is driven from the eight respective (normalized) bits into the speed DAC. Thus, as the various bits are activated, the respective analog switches close to achieve the desired total (parallel) resistance. As shown, the parallel network of these eight resistors connects to the summing input of amplifier A2-14 to provide the fine-phase-tuning described above. The resistance reciprocals are not weighted on a binary basis and this results in a non-monotonic scaling of the desired non-linear reciprocal-resistance-function, however the deviation from the monotonic function is within the acceptable stability limits. The parallel resistance of the network varies between 1 megohm (LSB switch closed) and 21K ohm (all switches closed). With 120K ohm feedback resistor in amplifier A2-14, the gain for the phase-correction contribution varies between 0.120 and 5.78. Recalling that the gain for the ramp and tachometer inputs is 31, the velocity error output as test point 22 is given by following:

$$\text{Velocity error} = Ve = 31R - 31T \pm XP \qquad (2)$$

where R is the ramp, T is the tachometer, P is the phase error and X is a variable gain factor which varies between 0.120 and 5.78, depending on the magnitude of the speed signal.

The above describes the steady state operation of the phase-lock section including the down counter, PLCL, phase comparator, phase error amplifier and variable resistance connection to the velocity error amplifier. As mentioned previously, however, the phase-lock-loop cannot be closed arbitrarily without introducing a phase-disruption. The dynamics of closing the loop without introducing a phase-disruption is discussed below.

The criteria for closing the phase-lock-loop is as follows. During the velocity ramp, the loop must be open, and when the up-to-speed signal activates, indicating the end of ramp, the loop is kept open for an additional 140 m.sec. to allow for velocity overshoot and settling before the loop is closed. When the loop is closed, it is done under carefully controlled conditions to avoid introduction of a phase-disruption as follows.

Figure 7:
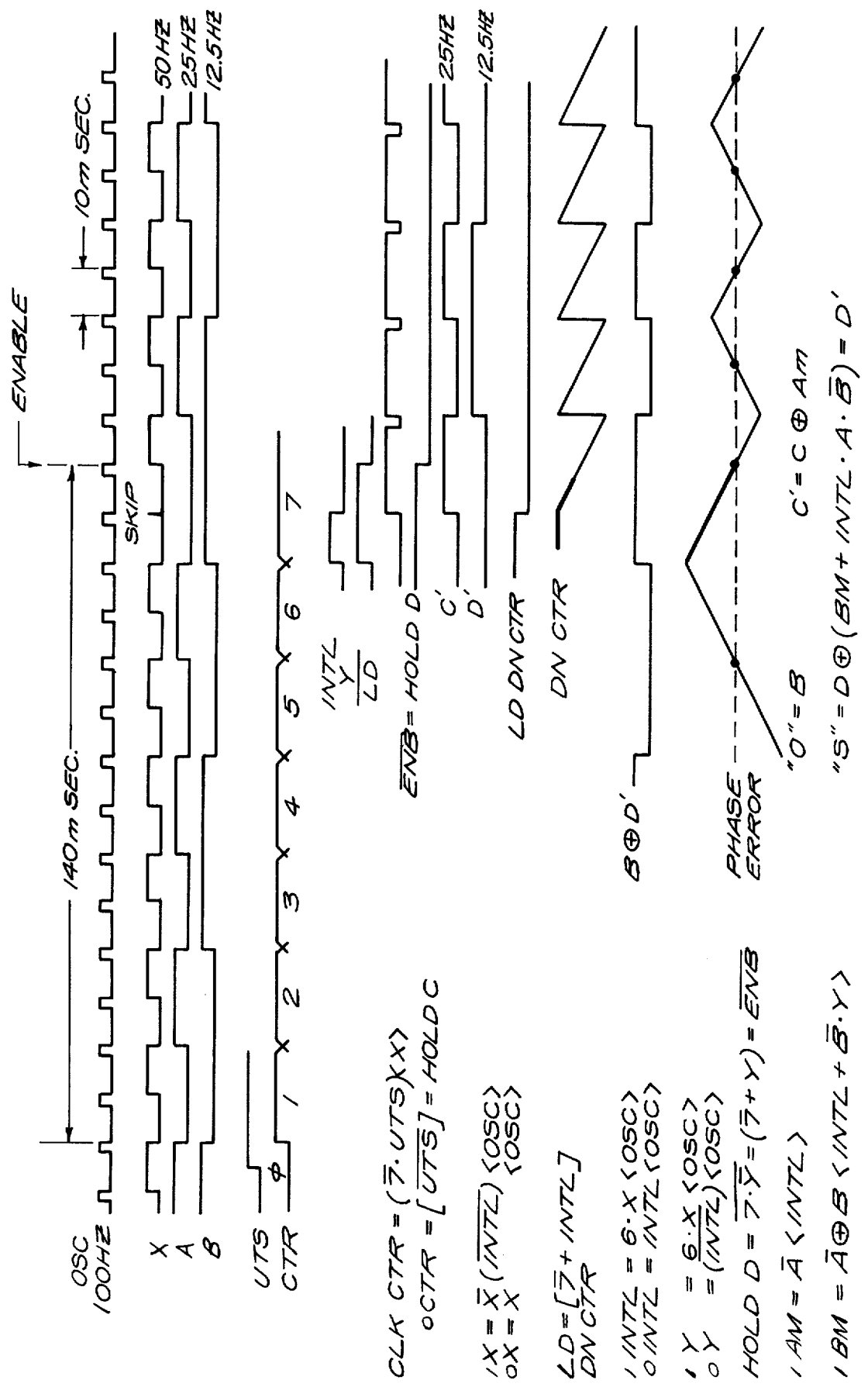
FIG. 7 is a timing diagram illustrating closing of the phase lock loop.

FIG. 7 is a timing diagram showing the loop closure activity and logic equations for the various controlling elements. The timing is shown for the first (60 pulse encoder) embodiment. It is noted that the timing for the second and third (72 pulse encoder) embodiments is identical except everything occurs faster by a factor of 6/5. It is noted further that the X flip-flop, test point 15, is clocked (pointer brackets indicate the clocking term) by the 100 Hz oscillator and when the up-to-speed signal occurs, the reset, test point 17, is removed from the (divide by eight) counter, D3, and the counter is clocked by the X flip-flop, F3-3, and allowed to advance to the count of seven. At the count of six, the INTL flip-flop, test point 18, and Y flip-flop, test point 19, are set. Note that INTL and Y reset on the first and second following oscillator pulses respectively. INTL and Y provide important timing for loop closure.

Figure 8:
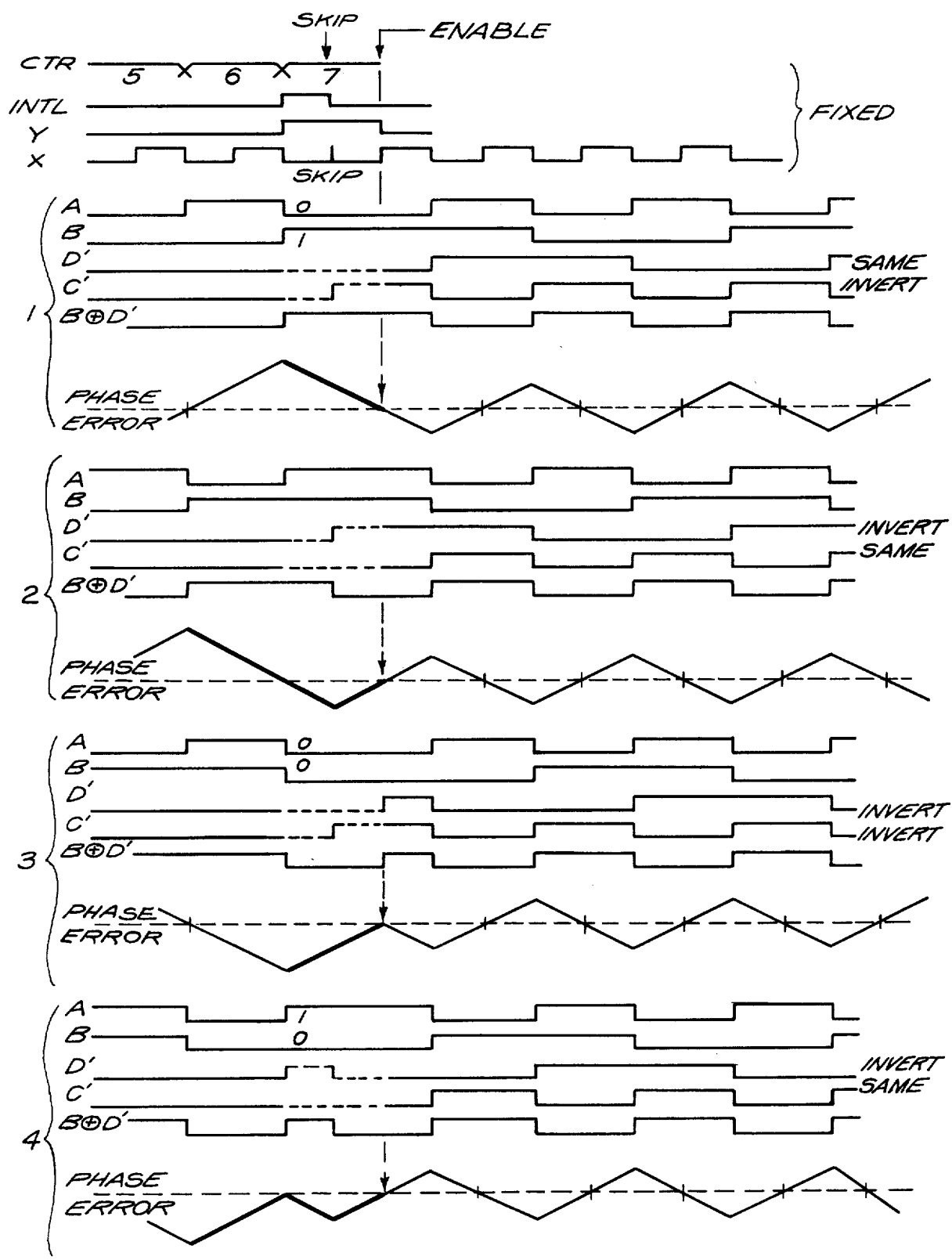
FIG. 8 illustrates the four possible loop closure event sequences.

Once the loop closure occurs, the steady-state 90 degree phase shift between the B and D' ("O" and "S") inputs to the phase comparator is established as shown in FIG. 7. The loop closure, ENB, occurs when Y is reset. At this time the B and D' components must meet the 90 degree criteria, and the integrated output of the phase comparator must be at zero to avoid introducing a phase-disruption. It is observed that X, A and B form a ripple counter, and the divide by eight counter is clocked by X. Therefore, when the count changes from six to seven, X is at a known state, but A and B can occur in any one of four possible states. FIG. 7 shows the events for one of these four possible states. FIG. 8 shows the events for all four possible states.

The above two requirements (to avoid a phase-disruption) are met as follows. The X flip-flop is caused to skip once. This causes a small phase change to the oscillator, B, input. The C and D flip-flops are reset to zero prior to phase lock enable, ENB, time. This locks-up the D' input to the phase comparator causing a known and predictable phase error at the low-pass-filter output. The AM (F2-3) and BM (F2-5) flip-flops are set to remember the state of the A and B flip-flops at the time of closure. (Note that the clock time for the BM flip-flop is altered as required to achieve the desired results.) The AM flip-flop connects to gate E4-11 and controls the polarity of the clocking signal to the D flip-flop, F4-5. The BM flip-flop (and three other signals) determine the polarity of the D' input to the phase comparator by means of gate E4-3.

By the above logical manipulation, and as illustrated in FIG. 8, the desired results are obtained. The four possible closure event sequences are depicted in FIG. 8, and are most easily identified by observing the low-pass filter, phase-error output, as shown by the darkened lines. These differences are characterized in FIG. 9, where the amplitude is assigned units of 0,1, and 2 and time is referenced from the leading edge of the Y flip-flop. Note in FIG. 7 that prior to skip time, the down counter is loaded (held) with the speed signal, but at skip time, the load signal is removed, and the down counter begins its preset operation by counting down to zero. At each zero count, the counter is reloaded, test point 13, to drive the C and D flip-flops in a ripple counter mode. The enable signal is generated at gate D2-6 and connects to one input of balled-or-gate D4-3 to generate the $\overline{\text{ENB}}$ signal which connects to the main board via P3 ribbon pin 14 and drives transistors Q8 and Q9. The collectors of transistors Q8 and Q9 connect directly to the respective enable inputs of the analog switches B2 and B1. In this way the on/off feature to close or open the loop is achieved. Test point 24, the other input to balled-or-gate D4-3, is provided as an easy means to disable the phase-lock during test. When test point 24 is grounded, D4-3 is forced high to disable the analog switches and disable the fine-phase-timing.

As indicated above, there is some ripple on the analog phase error signal, test point 21, and in fact FIGS. 7 and 8 show the ripple wave form on the phase error signal. The ripple is a natural by-product of the filtering action of the digital signal, which is performed by amplifier C2-14. The analog phase error signal, as seen in the schematic is coupled through the 8 precision resistors R60 through R67 (R3 variable resistor in FIG. 1) to the input to amplifier A2-14 (amplifier 1 in FIG. 1). This low amplitude ripple passes through amplifier A2-14 (amplifier 1), C3-7 (PWM in FIG. 1), the optical couplers, and to the motor and ultimately manifests as a small amount of velocity ripple at the motor shaft. This velocity ripple is sometimes called wow or flutter. It is not great, and by most standards would not be objectionable. If desired, however, it may be reduced greatly as follows.

Referring to FIG. 3 in conjunction with FIGS. 7 and 8, it is noted that three operational amplifiers are used in the ripple compensation circuit. The input signal as seen in FIGS. 7 and 8 is basically a DC voltage with 25/30/30 Hz (corresponding to the first, second and third embodiments, respectively) ripple, which in this case can be assumed to be a triangle wave form. Amplifier U1-1 is connected as a unity gain AC coupled inverting amplifier, or high-pass active filter. Capacitor C31 AC couples (removes any DC component of the signal) the phase error signal to resistor R100. The ratio of R101 to R100 is unity. Therefore, the signal at amplifier U1-1 will be the inverted AC component of the phase error signal which is the ripple. The above technique essentially separates the AC ripple component from the phase error signal. The "RC" time constant is determined by capacitor C31 and resistor R100. This value is made large enough to preserve the triangle wave form but small enough to quickly recover from DC voltage level shifts. This criteria is important to avoid servo instability which would result if this value is too large.

Amplifier U1-7 is also a unity gain amplifier by virtue of the resistor ratios, but R102 and R103 act as summing resistors. The phase error signal connects to resistor R102 and the inverted ripple signal from amplifier U1-1 connects to resistor R103. Because the ripple signal into the summing network is inverted, the network essentially subtracts the AC ripple and the output at U1-7 is the inverse DC component of the phase error signal, with the AC ripple component subtracted or removed.

Amplifier U1-14 is a unity gain inverting amplifier by virtue of the resistor ratios, and serves to invert the DC component of the phase error signal back to its original polarity. The output of amplifier U1-14, then, serves as a ripple compensated (ripple removed) phase error signal in place of the signal from C2-14 which contains ripple.

The result of adding the ripple compensation circuit is a resultant speed at the motor shaft which has its 25/30/30 Hz wow or flutter component reduced to approximately 5 to 10 percent of what it would be without any ripple compensation.

Accordingly, it is clear that the above description of the preferred embodiment in no way limits the scope of the present invention which is defined by the following claims.

What is claimed is:

1. A system for controlling the speed of a motor comprising:

(a) a first system input terminal for receiving a first digital number representative of a desired acceleration characteristic for said motor;

(b) a second system input terminal for receiving a second digital number representative of a desired speed for said motor;

(c) a first digital to analog converting means operatively connected to said first system input terminal;

(d) a second digital to analog converting means operatively connected to said second system input terminal;

(e) a ramp generating means operatively connected to said first digital to analog converting means via a resistance means and operatively connected to said second digital to analog converting means via a comparator network means;

(f) a velocity error summing amplifier means having a first, second, and third input terminal, the output of said ramp generating means operatively connected to the first input terminal of said velocity error summing amplifier means;

(g) a pulse width modulating means operatively connected between said velocity error summing amplifier means and said motor;

(h) encoding means connected to said motor;

(i) sensing means associated with said encoding means;

(j) tachometer means operatively connected to said sensing means, said tachometer means having an analog output terminal and a digital output terminal, said analog output terminal connected to the second input terminal of said velocity error summing amplifier means;

(k) variable-modulo counting means operatively connected to said second system input terminal and including clocking means operatively connected to the digital output terminal of said tachometer means;

(l) decoding means operatively connected to said variable-modulo counting means;

(m) phase lock loop closing means operatively connected to said decoding means and to a crystal-controlled reference signal source means;

(n) phase detecting means operatively connected to said phase lock loop closing means for comparing the phase of the decoded output signal from said variable-modulo counting means with the phase of a reference signal from said crystal-controlled reference signal source means and generating a phase error output signal;

(o) phase error amplifying means operatively connected to said phase detecting means for amplifying the phase error output signal of said phase detecting means; and (p) variable resistance means operatively connected to the output of said phase error amplifying means and to the third input terminal of said velocity error summing amplifier means for controllably coupling said amplified phase error output signal to said velocity error summing amplifier means thereby effecting precise phase lock velocity control of the speed of said motor.

2. A motor speed control system as recited in claim 1 further including an optical coupling means operatively connected to the output of said pulse width modulating means; an amplifying means operatively connected to said optical coupling means, a first transistor control means operatively connected between said amplifying means and said motor for causing the motor to operate; and a second transistor control means operatively connected to said motor for causing the motor to brake.

3. A motor control system as recited in claim 2 wherein a ripple compensation means is operatively connected between said phase error amplifying means and said variable resistance means.

4. A motor speed control system as recited in claim 3 wherein said second digital number is an 8-bit binary number expressed in excess-10 hexadecimal format, and said system includes means operatively connected between said second system input terminal and said second digital to analog converting means and said variable-modulo counting means for converting said second digital number to hexadecimal format.

* * * * *